United States Patent
Nakashima

[11] Patent Number: 6,049,365
[45] Date of Patent: Apr. 11, 2000

[54] LIQUID CRYSTAL DISPLAYING APPARATUS WITH A CONVERTER NOT EXPOSED TO LIQUID CRYSTAL

[75] Inventor: Ken Nakashima, Tokyo, Japan

[73] Assignee: Mitsubishi Denki Kabushiki Kaisha, Tokyo, Japan

[21] Appl. No.: 09/200,466

[22] Filed: Nov. 27, 1998

[30] Foreign Application Priority Data

May 7, 1998 [JP] Japan ..................................... 1-024601

[51] Int. Cl.[7] .......................... G02F 1/136; G02F 1/1343; G02F 1/1345
[52] U.S. Cl. .............................. 349/42; 349/43; 349/139; 349/141; 349/152
[58] Field of Search ................................ 349/42, 43, 152, 349/153, 139, 141

[56] References Cited

U.S. PATENT DOCUMENTS

| | | | |
|---|---|---|---|
| 4,394,067 | 7/1983 | Spruijt et al. | 350/334 |
| 4,647,156 | 3/1987 | Fujimura et al. | 349/153 |
| 4,854,675 | 8/1989 | Yamazaki et al. | 350/336 |
| 5,278,682 | 1/1994 | Niki | 349/153 |
| 5,287,208 | 2/1994 | Shimoto et al. | 359/75 |
| 5,317,434 | 5/1994 | Ohara | 349/153 |
| 5,396,356 | 3/1995 | Fukuchi | 359/80 |
| 5,619,358 | 4/1997 | Tanaka et al. | 349/143 |
| 5,828,433 | 10/1998 | Shin | 349/152 |
| 5,835,178 | 11/1998 | Sone et al. | 349/149 |
| 5,844,644 | 12/1998 | Oh et al. | 349/141 |
| 5,870,160 | 2/1999 | Yanagawa et al. | 349/141 |
| 5,889,573 | 3/1999 | Yamamoto et al. | 349/152 |

FOREIGN PATENT DOCUMENTS

| | | |
|---|---|---|
| 59-151137 | 8/1984 | Japan . |
| 8-95078 | 4/1996 | Japan . |

*Primary Examiner*—William L. Sikes
*Assistant Examiner*—Tarifur R. Chowdhury
*Attorney, Agent, or Firm*—Oblon, Spivak, McClelland, Maier, & Neustadt, P.C.

[57] ABSTRACT

A liquid crystal displaying element and a liquid crystal displaying apparatus are provided which are not deteriorated in the liquid crystal by the third conductor and is not reduced in display and reliability. In the liquid displaying element of this invention, when the gate terminal and the gate wiring are connected, of a material superior in corrosion resistance of a first conductor, and a second conductor to be used as a material of the source wiring, and the source terminal and the source wring are connected, a convertor when the first conductor and the second conductor are connected through the third conductor in the connecting portion between the first conductor and the second conductor is a liquid crystal displaying element, and the convertor is positioned covered with the sealing agent in the area were the sealing agent is formed.

6 Claims, 10 Drawing Sheets

LIQUID CRYSTAL DISPLAYING APPARATUS WITH A CONVERTER NOT EXPOSED TO LIQUID CRYSTAL

BACKGROUND OF THE INVENTION

1. Field of the Invention

The present invention relates to an active matrix LCD (liquid crystal displaying device).

2. Discussion of the Background

In recent years, the LCD is improved for higher image quality and larger image field as a display instead of a CRT. Thus, a new material is used, and the manufacturing process and the configuration in using it are considered.

One example of the aforementioned conventional LCD will be described hereinafter with reference to the accompanying drawings.

FIG. 10 is a sectional view of the essential portions of a TFT array substrate of the LCD to be used in the conventional LCD. Referring to FIG. 10, reference numeral 201 is a TFT portion, reference numeral 202 is a gate source intersecting portion, reference numeral 203 is an auxiliary capacitance portion, reference numeral 17 is a convertor, reference numeral 27 is a pixel electrode, reference numeral 60 is a first conductor, reference numeral 61 is a second conductor, and reference numeral 54 is a third conductor.

The conventional LCD is composed of a TFT array substrate, an opposite substrate arranged opposite to the TFT array substrate, and a liquid crystal to be interposed by both the substrates, with the periphery of both the substrates being bonded with a sealing agent. On the TFT array substrate are provided a plurality of mutually parallel gate wirings and a plurality of mutually parallel source wirings to be crossed to the respective gate wirings through the gate insulating film to be rovided on the gate wirings, with the pixels being regions to be defined by the gate wirings and the source wirings. On each pixel are provided in array-like shape pixel electrodes and TFT (thin film transistors). An alignment layer is provided, covering the gate wirings, the source wirings, the pixel electrodes and the TFT (in the conventional example, a channel etch type). On the opposite substrate are provided a color filter, a black matrix, and an alignment layer corresponding to the pixel. The liquid crystal uses the known liquid crystal material.

In order to drive such a liquid crystal, a drive circuit is provided around the LCD. Behind the LCD is sometimes provided a back light.

In order to connect the pixel electrode provided on the TFT array substrate, and the TFT and the drive circuit, various conductors and contact holes are provided on the TFT array substrate to connect the gate wiring and the source wiring.

FIGS. 11–13 show a disclosure from a related Japanese Application Serial No. 124601/1998, the Applicant of which is the same as that of the instant application, which had not been published at the time of the Japanese priority document on which the presgfit document is based was published.

FIG. 11 is a plan view showing the arrangement of the wirings, terminals and so on provided on the TFT array substrate. Referring to FIG. 11, reference numeral 12 is a gate wiring, reference numeral 13 is a source wiring, reference numeral 72 is a gate terminal, reference numeral 73 is a source terminal, reference numeral 60 is a first conductor, reference numeral 61 is a second conductor, reference numeral 54 is a third conductor, and reference numeral 17 is a convertor. The right side and the under side of one dot chain line L are displaying regions.

As shown in FIG. 11, the gate wiring 12 and the gate terminal 72 are connected with the first conductor 60. The source wiring 13 and the source terminal 73 are connected by the first conductor 60 and the second conductor 61 through the third conductor 54. Such connecting method is used because the material for connecting with the terminal is made of a material superior in corrosion resistance or a material low in wiring resistivity. In an example shown in the diagram, the gate wiring is composed of the first conductive material, and the source wiring is composed of the second conductive material, with the material of the gate wiring being superior in corrosion resistance. In this case, on the source wiring side is provided a convertor 17 to which the first conductor and the second conductor are connected through the third conductor.

FIG. 12 is a sectional view showing the connection between such a conductor and a contact hole. FIG. 13 is a sectional view showing the example where the connection is provided in contact with the liquid crystal.

In FIG. 12 and FIG. 13, reference numeral 21 is an insulating substrate (hereinafter referred to as a substrate) using the insulating material such as glass, reference numeral 60 is a first conductor formed on the substrate 21 using the conductor such as Cr, reference numeral 61 is a second conductor formed on the substrate 21 using the conductor such as Cr, reference numeral 23 is a first insulating film formed on silicon nitride or the like, reference numeral 102 is a second insulating film formed on the silicon nitride or the like, reference numeral 103c is a contact hole formed on the first conductor 60, reference numeral 103d is a contact hole formed on the second conductor 61, reference numeral 54 is a third conductor using a conductor such as Cr for connecting the first conductor 60 and the second conductor 61 through the contact hole 103c and the contact hole 103d, reference numeral 17 is a convertor for connecting the first conductor 60 with the second conductor 61 with the material being changed with the third conductor 54, reference numeral 50 is a liquid crystal, reference numeral 51 is a sealing agent, and reference numeral 53 is an opposite substrate.

In the convertor 17 shown in FIG. 12, there is no passivation film made of a material such as silicon nitride on the third conductor 54. Thus, in the LCD having the convertor 17, such problems as described hereinabove are caused.

The problems will be described with reference to FIG. 13. The first conductor 60 is a wiring, formed with the gate wiring material, to be connected with the external terminal. The second conductor 61 is a wiring, formed with a source wiring material, to be connected with the external terminal, with the third conductor 54 functioning to connect the first conductor with the second conductor. The reasons to be adopted in such a configuration are provided because (1) the wiring to be connected with the external terminal, as described, is required to be formed in the gate wiring material, when the source wiring material tends to corrode more than the gate wiring material, and (2) a process for forming a contact hole for directly connecting the external terminal formed with the source wiring and the gate wiring material is omitted. The third conductor 54 is formed of the same material as that of the pixel electrode for applying the voltage upon the liquid crystal in the display region and an insulating film is not provided on the pixel electrode to reduce the loss of the voltage to be applied upon the liquid crystal. To cover the third conductor with the insulating film, a new process is required and the cost increases. The third conductor is provided as the uppermost layer and is exposed.

In the LCD in which the convertor 17 is provided in such a manner as to directly contact with the liquid crystal 50 as shown in FIG. 13, the third conductor 54 of the convertor 17 is in contact with the liquid crystal 50 and a signal to be applied upon the first conductor 60 or the second conductor 61 is applied upon the liquid crystal 50 with the third conductor 54 as an electrode. Thus, the liquid crystal near the third conductor 54 is deteriorated, resulting in inferior display and the reduced reliability.

When the gate wiring material uses a material which tends to corrode more than the source wiring material, the gate wiring is required to be connected with the external terminal through the wiring made of a source wiring material. In this case, the wiring material is required to conduct, through the third conductor, so that the gate wiring may be connected with the wiring, connected to the external terminal formed made of the source wiring material. Thus, due to direct contact between the third conductor 54 hand the liquid crystal as in the configuration shown in FIG. 13, the liquid crystal near the third conductor 54 is deteriorated, thus resulting in the inferior display and reducing the reliability.

Since the third conductor 54 of the conductor 17 comes in contact with the liquid crystal as described above in the conventional LCD, the reliability is reduced. An object of the present invention is to provide an LCD element and an LCD higher in reliability, by solving the aforementioned problems.

SUMMARY OF THE INVENTION

A liquid crystal displaying element of a first embodiment of the present invention is composed of a TFT array substrate, an opposite substrate opposite to the TFT array substrate, and a liquid crystal interposed between the TFT array substrate and the opposite substrate, wherein (a) the periphery of the TFT array substrate and the periphery of the opposite substrate is bonded with a sealing agent, (b) a pixel electrode and a TFT are provided on each pixel defined by the gate wiring and the source wiring provided on the TFT array substrate and crossed mutually and the source wiring, (c) an alignment layer covering the displaying region where the gate wiring, the source wiring, and the pixel electrode and the TFT are positioned in matrix, and (d) the gate terminal and the source terminal are provided around the displaying region, (e) when the extending line to the gate terminal is formed of either a first conductor to be used as a material of the gate wiring or a second conductor to be used as a material of the source wiring, the gate terminal and the gate wiring are connected, the extending line to the source terminal is formed, and the source terminal and the source wiring are connected, a convertor where the first conductor and the second conductor are connected through the third conductor in the connecting portion between the first conductor and the second conductor is a liquid crystal displaying element, and the convertor is positioned covered with the sealing agent in the area where the sealing agent is formed.

An IPS (In-Plane Switching) mode liquid crystal displaying apparatus of a second embodiment of the present invention is composed of an electrode substrate, an opposite substrate opposite to the electrode substrate, and a liquid crystal interposed between the electrode substrate and the opposite substrate, and at least a liquid crystal displaying element with the periphery of the electrode substrate and the opposite substrate being bonded with a sealing agent, a drive circuit for driving the liquid crystal, and a backlight, (a) at least a pair of electrodes composed of a first electrode and a second electrode are provided at a constant distance on the electrode substrate, (b) the liquid crystal is driven by the electric field formed between the first electrode and the second electrode, (c) an alignment layer is provided covering the display region where the first electrode and the second electrode are positioned, (d) a first terminal and a second terminal are positioned on the periphery of the displaying region, (e) when the extending line to the first terminal is formed of either a first conductor to be used as a material of the first electrode, or a second conductor to be used as a material of the second electrode, the first terminal and the first electrode are connected, the extending line to the second terminal is formed and the second terminal and the second electrode are connected, a convertor where the first conductor and the second conductor are connected through the third conductor in the connecting portion between the first conductor and the second conductor is an inplane electric field liquid crystal displaying apparatus, and the convertor is positioned covered with the sealing agent.

A reflective liquid crystal displaying apparatus of a third embodiment of the present invention is composed of a TFT array substrate, an opposite substrate opposite to the TFT array substrate, and a liquid crystal interposed between the TFT array substrate and the opposite substrate, and has at least a liquid crystal displaying element with the periphery of the TFT array substrate and the opposite substrate being bonded with a sealing agent, a drive circuit for driving the liquid crystal, (a) a pixel electrode and a TFT made of a metal film at each pixel marked by the gate wiring and the source wiring are provided on the TFT array substrate and intersected mutually, (b) an alignment layer is provided covering the displaying region where the gate wiring, the source wiring, the pixel electrode and the TFT are provided in matrix shape, (c) the gate terminal and the source terminal are provided on the periphery of the displaying region, (d) when the extending line to the gate terminal is formed of either a first conductor to be used as a material of the gate electrode wiring, or a second conductor to be used as a material of the source electrode, the gate terminal and the gate wiring are connected, the extending line to the source terminal is formed, and the source terminal and the gate wiring are connected, a convertor where the first conductor and the second conductor are connected through the third conductor in the connecting portion between the first conductor and the second conductor is a reflection liquid crystal displaying apparatus, and the change is positioned covered with the sealing agent on the region where the sealing agent is formed.

DETAILED DESCRIPTION

The embodiments of the present invention will be described in further detail with reference to the drawings.

EMBODIMENT 1

In this embodiment, an example of a liquid crystal displaying element will be described wherein the aforementioned convertor is positioned covered with a sealing agent on a region where the sealing agent is formed with using a sealing agent for bonding the TFT array substrate and the opposite substrate.

Figure 1A:
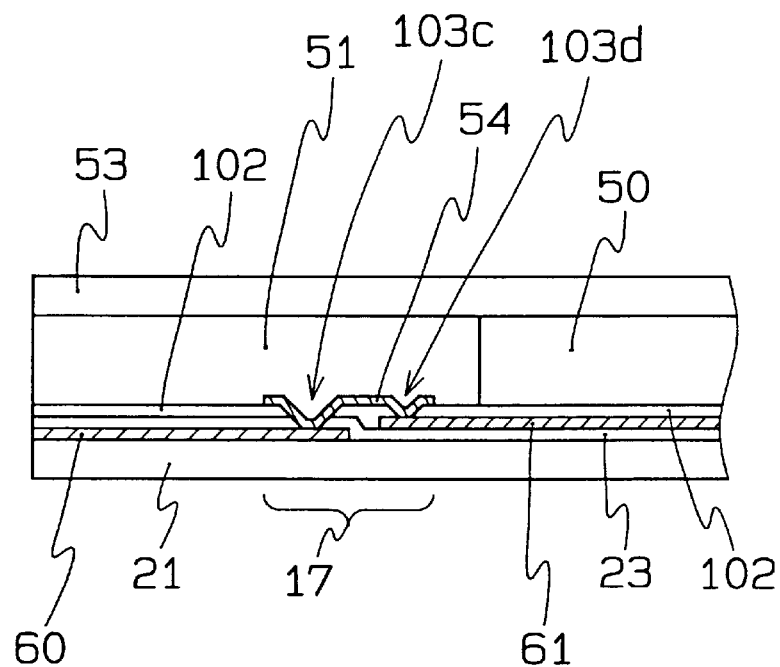
FIGS. 1(*a*) and 1(*b*) are each partial sectional view of a liquid crystal displaying element of one embodiment of the present invention.
Figure 1B:
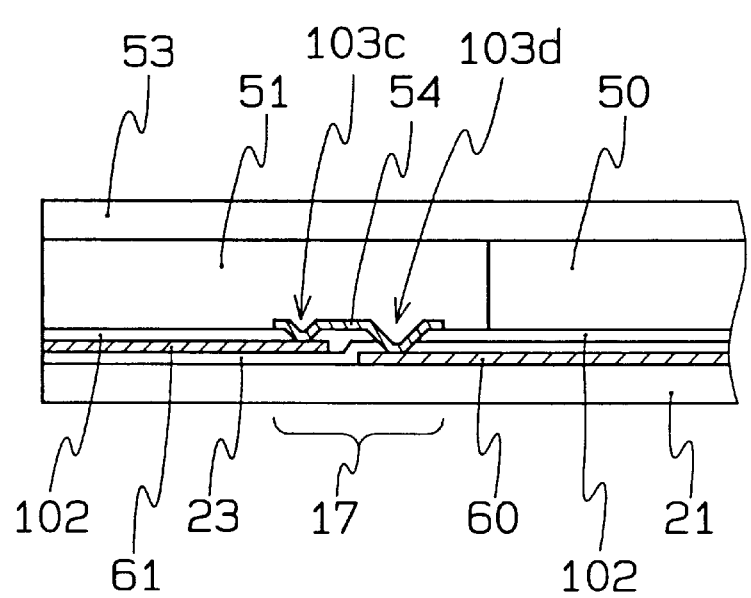

FIGS. 1(a) and 1(b) are each partial sectional view of a liquid crystal displaying element of the embodiment.

Referring to FIGS. 1(a) and 1(b), reference numeral 21 is an insulting substrate using an insulating material such as glass or the like, reference numeral 60 is a first conductor formed on the substrate 21 using a conductor such as Cr, reference numeral 61 is a second conductor formed on the substrate 21 using the conductor such as Cr, reference numeral 23 is a first insulating film formed with silicon nitride or the like, reference numeral 102 is a second insulating film formed on the silicon nitride or the like, reference numeral 103c is a contact hole formed on the first conductor 60, reference numeral 103d is a contact hole formed on the second conductor 61, reference numeral 54 is a third conductor using a conductor such as Cr for connecting the first conductor 60 and the second conductor 61 through the contact hole 103c and the contact hole 103d, reference numeral 17 is a convertor for connecting the first conductor 60 and the second conductor 61 with the material being converted with the third conductor 54, reference numeral 50 is a liquid crystal, reference numeral 51 is a sealing agent, and reference numeral 53 is a an opposite substrate.

Since the conventional liquid crystal element is the same except in that the liquid crystal displaying element is of such a configuration as described above, the illustration is omitted. Each element shown in the drawings will be omitted in illustration about the same element as before.

A process flow will be described. A conductive film, using one metal of Cr, Al, Ti, Ta, Mo, W, Ni, Cu, Au or Ag, or an alloy with at least one of them as an essential element, or a material for transparent conductive film use such as ITO or the like, or a multi-layer film using these conductive materials are formed on the insulating substrate 21 by a sputtering method, an evaporating method or the like, and a first conductor film 60 of a desired shape is formed by a photolithography process etching working method. A first insulating film 23 composed of an insulating film using the silicon nitride or silicon oxide or a multi-layer film using them is formed by, for example, plasma enhanced CVD (hereinafter referred to as CVD), atmospheric-pressure vapor deposition, or a low pressure chemical vapor deposition. A conductive film, using one metal of Cr, Al, Ti, Ta, Mo, W, Ni, Cu, Au or Ag, or an alloy with at least one of them as a main component, or a material for transparent conductive film use such as ITO, or formed by a sputtering method, an evaporating method or the like, and a second conductor film 61 of a desired shape is formed by a photolithography process etching working method. A second insulating film 102 composed of an insulating film using the silicon nitride, silicon oxide or inorganic insulating film or an insulating film of organic resin, a multi-layer film using them is formed by, for example, CVD, atmospheric-pressure vapor deposition, or a low pressure chemical vapor deposition, and contact holes 103c and 103d are formed by the photolithography process or etching working. A conductive film, using one metal of Cr, Al, Ti, Ta, Mo, W, Ni, Cu, Au or Ag, or an alloy with at least one of them as an essential element, or a material for transparent conductive film use such as ITO, or a multi-layer film using these conductive materials are formed by a sputtering method, an evaporating method or the like, and the third conductor 54 of desired shape is formed by the photolithography process or etching working. In the convertor 17, the first conductor 60 and the second conductor 61 are connected by the third conductor 54 through the contact hole 103c and the contact hole 103d. The liquid crystal 50 is interposed with the substrate 21 and the opposite substrate 53, and the substrate 21 and the opposite substrate are bonded with the sealing agent 51, so as to manufacture the LCD. In this case, the third conductor 54 of the convertor 17 is covered with the sealing agent 51.

As the sealing agent, the thermosetting synthetic resin or the photocuring synthetic resin can be used. For example, as an example of thermosetting synthetic sealing agent, XN31 made by Mitsui Toatu Kagaku Kabushiki Kaisha or as an example of the photocuring synthetic sealing agent, X-765A1 made by Kyoritsu Kagaku Sangyo Kabushiki Kaisha or XNR5612 made by Nagase Chiba Kabushiki Kaisha can be provided. Spacers such as glass rod or the like are mixed to obtain the desired substrate distance by the sealing agent for formation on the convertor with screen printing or the like.

In the liquid crystal displaying element of the embodiment, a portion where the liquid crystal 50 exists and a portion where the third conductor 54 exists are separated, so that the third conductor 54 of the convertor 17 is covered with the sealing agent 51. Thus, the liquid crystal near the third conductor 54 is not deteriorated without application of the signal applied upon the first conductor 60 or the second conductor 61 with the third conductor 54 as an electrode.

Since the third conductor 54 is covered with the sealing portion, the corrosion of the convertor, the physical damage or leakage current of the convertor to displaying apparatus external portion is not caused.

Thus, the liquid crystal displaying element high in reliability can be obtained.

Although the third conductor can be formed in a different layer and the uppermost layer through the first conductor and the second conductor, and the insulating film, the same effects can be obtained with the omission of the first insulating film 23. As in FIG. 1 (b), the same effects can be obtained even in a configuration where a first conductor 60 which is the wiring on the inner side of the panel is converted into the second conductor 61 which is the wiring on the outer side of the panel.

In the description of the following embodiments, only the points different from those of EMBODIMENT 1 are described. The description will be omitted in the same or the common items.

EMBODIMENT 2

Figure 2:
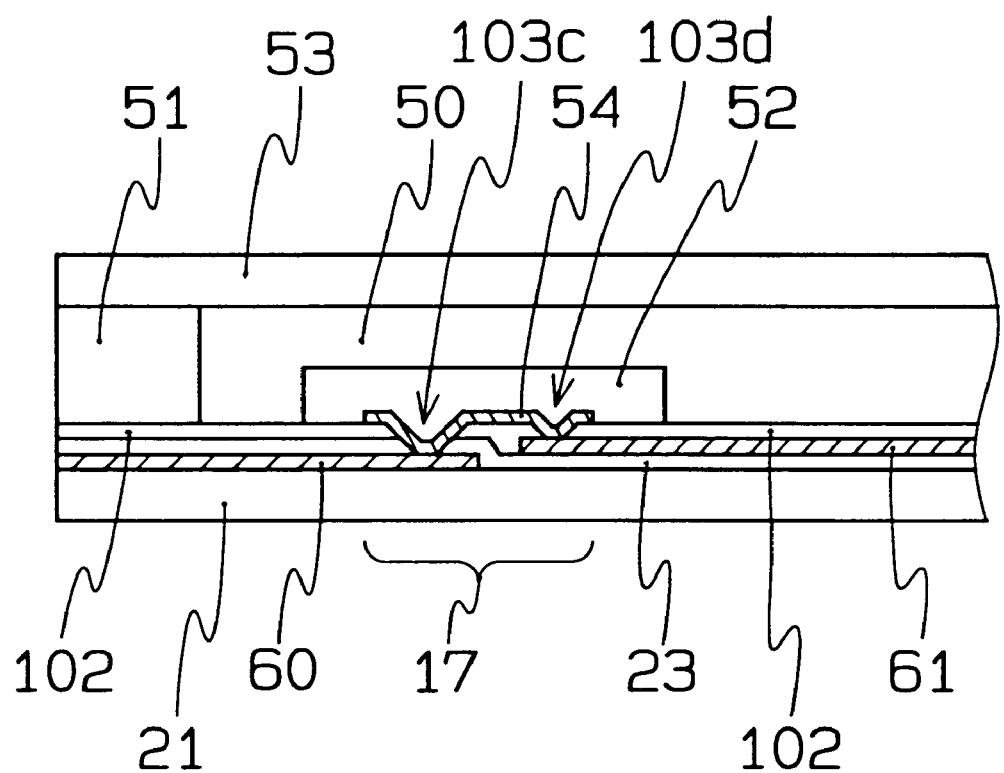
FIG. 2 is a partial sectional view of a liquid crystal displaying element of another embodiment of the present invention.

FIG. 2 is a partial sectional view of a liquid crystal displaying element of the embodiment. The same reference numerals are given to the same elements as those in FIGS. 1(*a*) and 1(*b*). Reference numeral 52 is an alignment layer.

In the present embodiment, as shown in FIG. 2, the third conductor 54 of the convertor 17 is covered by the alignment layer 52 such as polyimide, polyvinyl alcohol or the like having specific resistivity of $10^9$ Ω·cm or more, instead of the sealing agent 51 in EMBODIMENT 1.

The alignment layer 52 can be formed on the convertor by the known film forming method. Since the configuration except for these points, and the manufacturing method are the same as those of EMBODIMENT 1, the description will be omitted.

In this embodiment, the third conductor 54 of the convertor 17 is covered with the alignment layer 52 and thus, a portion where the liquid crystal 50 exists and a portion where the third conductor 54 exists are separated. Thus, the liquid crystal 50 near the third conductor 54 is not deteriorated without application of the signal applied upon the first conductor 60 or the second conductor 61 with the third conductor 54 as an electrode.

Since the third conductor 54 is covered with the alignment layer 52, the corrosion of the convertor, the physical damage or leakage current of the convertor to displaying apparatus external portion is not caused.

Thus, the liquid crystal displaying element high in reliability can be obtained.

The same effects can be obtained even when the first insulating film 23 is omitted. Also, the same effects can be often obtained even in the configuration where the first conductor 60 which is the wiring on the panel inner side converted into the second conductor 61 which is the panel outer side wiring.

EMBODIMENT 3

Figure 3A:
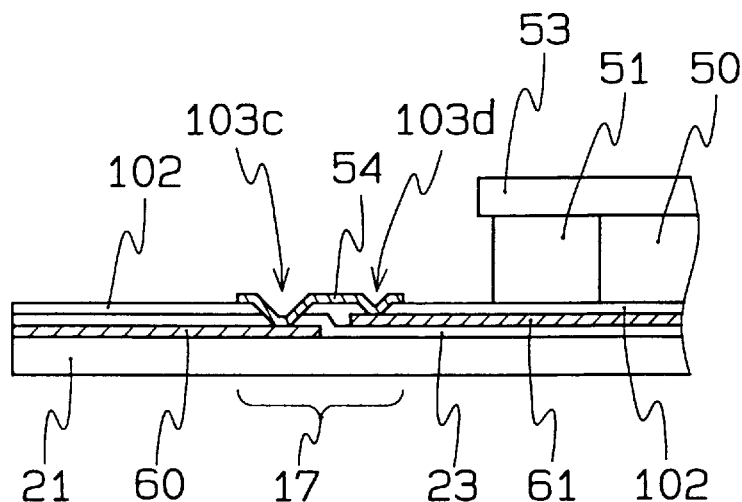
FIGS. 3(*a*) to 3(*c*) are each sectional view of a liquid crystal displaying element of still another embodiment of the present invention.
Figure 3B:
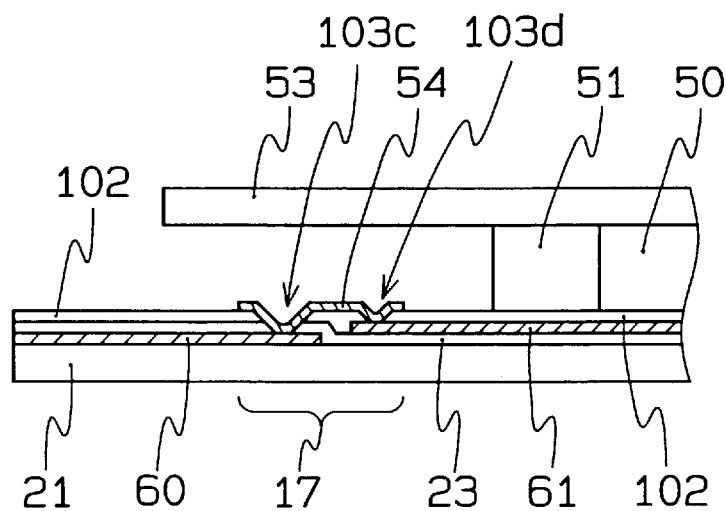
Figure 3C:
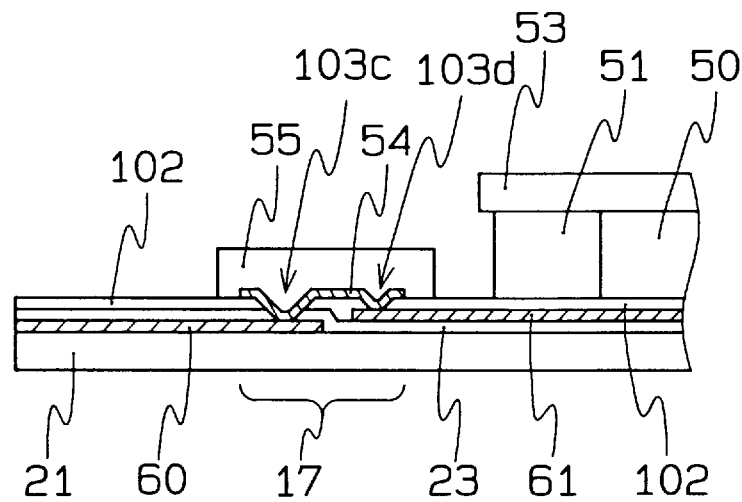

FIGS. 3(*a*) to 3(*c*) are each partial sectional views of the liquid crystal displaying elements of the embodiments 3 through 5 of the present invention.

In this embodiment, the third conductor 54 of the convertor 17 is set outside the sealing agent as shown in FIG. 3(*a*). Since the configuration and the manufacturing method except for this point are the same as those of EMBODIMENT 1, the description will be omitted.

In this embodiment, since the third conductor 54 of the convertor 17 is set outside the region where the sealing agent of the alignment layer 55 is formed, a portion where the liquid crystal 50 exists and a portion where the third conductor 54 exists are separated. Thus, the liquid crystal is not deteriorated without application, of a signal applied upon the first conductor 60 or the second conductor 61, with the third conductor 54 as the electrode.

Therefore, a liquid crystal displaying element high in reliability can be obtained. Further, the same effects can be obtained even in the configuration where the first conductor 60 which is the wiring on the panel inner side is converted into the second conductor 61 which is the wiring of the panel external side.

EMBODIMENT 4

In this embodiment, in addition to the embodiment 3, the third conductor 54 is covered by the opposite substrate 53 shown in FIG. 3(*b*). Since the configuration except for this point and the manufacturing method are the same as those in EMBODIMENT 3, the description will be described.

In the embodiment, the physical damage due to contact and the leakage current to the displaying apparatus external portion can be prevented by covering the third conductor 54 by the opposite substrate 53.

Thus, the crystal displaying element high in reliability can be obtained. Further, the same effects can be obtained even in the configuration where the first conductor 60 which is the wiring on the panel inner side converted into the second conductor 61 which is the wiring of the panel external side.

EMBODIMENT 5

In this embodiment, in addition to EMBODIMENT 4, the third conductor 54 is covered with an insulating material 55 having a specific resistance of $10^9$ Ω·cm or more, the same material as alignment layer composed of either of, for example, polyimide, polyvinyl alcohol, or silicone resin, acrylic resin or the like as shown in FIG. 3(*c*).

A film using these insulating material can be formed on the convertor by the known forming method. Since the configuration except for this point and the manufacturing method are the same as those in EMBODIMENT 1, the description will be described.

In the embodiment, the corrosion of the convertor 17, the physical damage due to contact and leakage current to the displaying apparatus external portion can be prevented by covering the third conductor 54 by the insulating material 55.

Thus, the liquid crystal displaying element high in reliability can be obtained. Further, the same effects can be obtained even in the configuration where the first conductor 60 which is the wiring on the panel inner side converted into the second conductor 61 which is the wiring of the panel external side.

EMBODIMENT 6

In this embodiment, the embodiments 4 and 5 are combined. Namely, the third conductor 54 is covered with an insulating material 55 having the opposite substrate 53 and a specific resistance of $10^9$ Ω·cm or more, the same material as alignment layer composed of either of, for example, polyimide, polyvinyl alcohol, or silicone resin, acrylic resin or the like. Since the configuration except for this point and the manufacturing method are the same as those in EMBODIMENT 1, the description will be described.

In the embodiment, the corrosion of the convertor 17, the physical damage due to contact and the leakage current to the displaying apparatus external portion can be prevented by covering the third conductor 54 by the insulating material 55.

Thus, the liquid crystal displaying element high in reliability can be obtained.

EMBODIMENT 7

In this embodiment, an LCD using the liquid crystal displaying element of any of EMBODIMENT 1 through EMBODIMENT 6 will be described.

FIGS. 4(*a*) to 4(*c*) and FIGS. 5(*a*) and 5(*b*) are sectional views showing the process order of the method of manufacturing the liquid crystal displaying element of EMBODIMENT 1 through EMBODIMENT 6.

In the drawings, reference numeral 201 is a TFT portion (channel etch type TFT), reference numeral 202 is a gate source intersecting portion, reference numeral 17 is a convertor, reference numeral 203 is a storage capacitor. The same reference numerals are given to the same elements as those shown in FIGS. 1(a), 1(b), 2, 3(a) and 3(b).

Referring to FIGS. 4(a) to 4(c) and FIGS. 5(a) and 5(b), reference numeral 21 is a substrate using an insulating material such as glass, reference numeral 22 is a gate electrode connected with the gate wiring formed on the substrate 21 using metal such as Cr, reference numeral 16 is a storage capacitor common line formed on the substrate 21 using metal such as Cr, reference numeral 23 is a gate insulating film composed of silicon nitride or the like formed to cover the gate electrode 12, the gate electrode 22 and the storage capacitor common line 16, reference numeral 24 is a semiconductor film using a semiconductor such as non-doped amorphous silicon or the like formed to come into contact with the upper portion of the gate insulating film 23, reference numeral 25 is a contact film where impurities such as phosphorus (P) having the region designated by reference numeral 26 in which the upper portion of the active region connected with the semiconductor 24, and having one portion of the film is removed by etching or the like are doped on the semiconductor film such as silicon (Si), reference numeral 27 is a pixel electrode which is made of transparent conductive film or the like such as ITO (indium tin oxide), and is used for applying the voltage upon the liquid crystal, reference numeral 28 is a source electrode formed to come into contact with the contact film 25 and connected with the source wiring 13, reference numeral 29 is a drain electrode formed to come into contact with the contacting film formed of silicon nitride film or the like to cover the entire device, reference numeral 103a is a contact hole formed on the interlayer insulating film 102 to connect the drain electrode 29 with the pixel electrode 27, reference numeral 103b is a contact hole formed on the interlayer insulating film 102 to connect the pixel electrode 27 with the storage capacitor common line 101, reference numeral 103c is a contact hole formed on a first conductor 60 to connect the first conductor 60 to a first conductor formed on the substrate 21 using the same material as that of the gate wiring 12 with a second conductor 61 formed on the substrate 21 using the same material as that of the source wiring 13 by a third conductor 54 using the same material as that of the pixel electrode 27. Reference numeral 103d is also a contact hole formed on the second conductor 61 to connect the first conductor 60 with the second conductor 61 by a third conductor formed using the same material as that of the pixel electrode.

The gate insulating film 23 and the interlayer insulating film 102 are equivalent to the first insulating film and the second insulating film shown in EMBODIMENT 1 through EMBODIMENT 3.

Figure 4A:
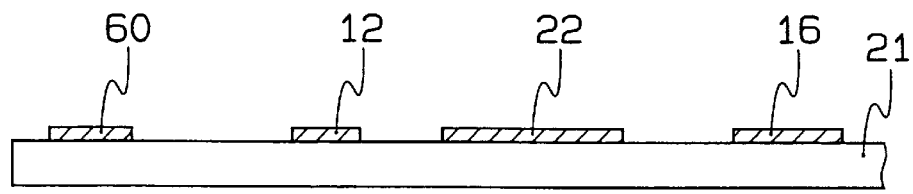
FIGS. 4(*a*) to 4(*c*) are each sectional view showing the process order of a method of manufacturing the liquid crystal displaying element of the present invention.
Figure 4B:
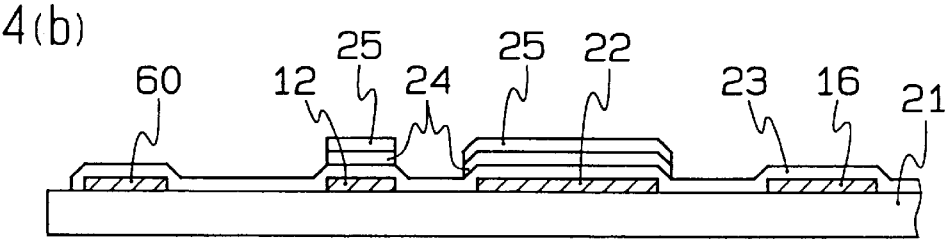
Figure 4C:
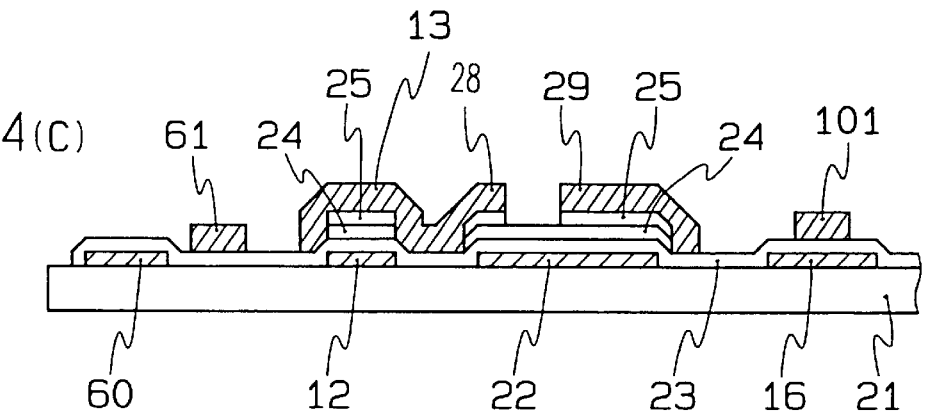
Figure 5A:
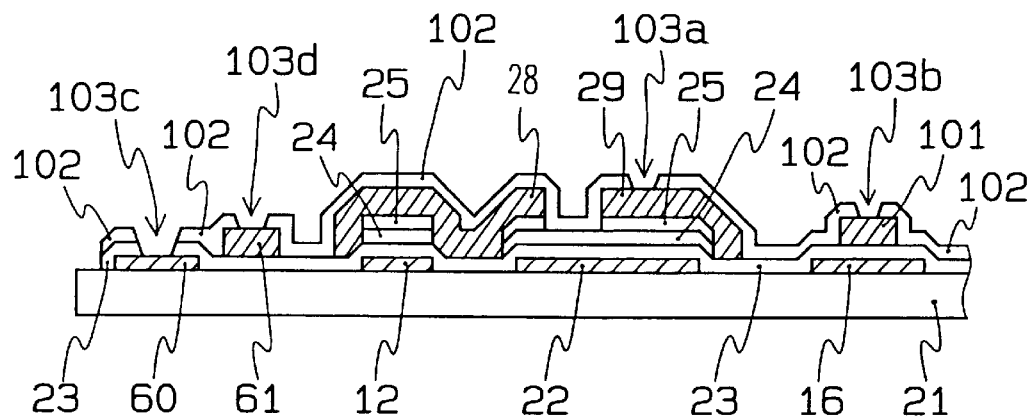
FIGS. 5(*a*) and 5(*b*) are each sectional view showing the process order of the method of manufacturing the liquid crystal displaying element of the present invention.
Figure 5B:
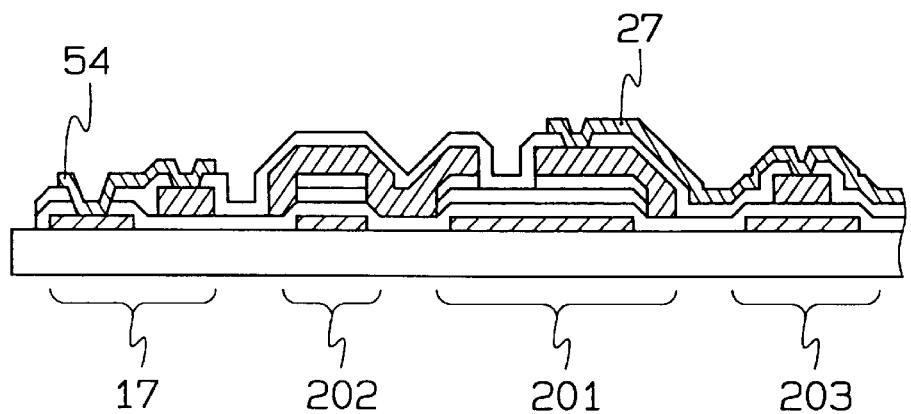

A process flow will be described. As shown in FIG. 4(a), a conductive film, using one metal of Cr, Al, Ti, Ta, Mo, W, Ni, Cu, Au or Ag, or an alloy with at least one of them as an essential element, or a material for transparent conductive film use such as ITO, or a multi-layer film using these conductive materials are formed on the insulating substrate 21 by a sputtering method, an evaporating method or the like, and a gate wiring 12, a gate electrode 22, and a storage capacitor common line 16 are formed by a photolithography process etching working method. As shown in FIG. 4(b), a gate insulating film 23 such as silicon nitride, a semiconductor film 24 such as amorphous silicon or polycrystalline silicon (poly-Si), and contact film 25 such as n$^+$ amorphous silicon or n$^+$ polycrystalline silicon when an impurity such as P is doped in high density in a case of n type TFT is formed by, for example, CVD, atmospheric-pressure vapor deposition, or a low pressure chemical vapor deposition. The contact film 25 and the semiconductor film 24 are worked into island shape. A conductive film, using one metal of Cr, Al, Ti, Ta, Mo, W, Ni, Cu, Au or Ag, or an alloy with at least one of them as a main component, or a material for transparent conductive film use such as ITO, or a multi-layer film using these conductive materials are formed on the insulating substrate 21 by a sputtering method, an evaporating method or the like. Then, the source electrode 28, the drain electrode 29, the storage capacitor electrode 101 are formed (FIG. 4(c)) by a photolithography process and a fine working art. The source wiring and the drain wiring which are made of the same material as that of the source electrode and the drain electrode are formed at the same time. A region 26 is provided by etching the contact layer 25 and removing from the channel region with the source electrode 28 and the drain electrode 29 or resist formed of them as a mask. The interlayer insulating film 102 made of silicon nitride and silicon oxide, inorganic insulating film or organic resin is filmed, so as to form contact holes 103a, 103b, 103c, and 103d (FIG. 5(a)) by photolithography process and its subsequent etching. Finally, a conductive film, using one metal of Cr, Al, Ti, Ta, Mo, W, Ni, Cu, Au or Ag, or an alloy with at least one of them as an essential element, or a material for transparent conductive film use such as ITO, or a multi-layer film using these conductive materials is formed and then, worked to form the pixel electrode 27 (FIG. 5(b)). The pixel electrode is connected with the drain electrode 29 through the contact hole 103a. The pixel electrode is connected with the storage capacitor electrode 101 through the contact hole 103b. The first conductor 60 made of a material (hereinafter referred to as gate material) using the gate electrode is short-circuited to the second conductor 61 made of a material (hereinafter referred to as source material) using the source electrode through a contact hole 103c and a contact hole 103d with a transparent conductive film 54 to be used a material of the pixel electrode 27. Therefore, a thin film transistor integrated apparatus can be manufactured. The TFT array substrate and opposite substrate are bonded with a sealing agent so as to interpose the liquid crystal between the TFT array substrate and the opposite substrate forming the thin film transistor integrated apparatus. The opposite substrate is used which is manufactured of the well known color filter, the black matrix, the alignment layer. Further, the gate line driving circuit, the source line driving circuit, and the storage capacitor common line power source are respectively connected with the gate wiring, the source wiring, and the storage capacitor common line, further the back light or the like is provided to manufacture the LCD.

In the LCD having the aforementioned configuration, the first conductors in EMBODIMENT 1 through EMBODIMENT 6 are wirings or electrodes formed of the gate material, the second conductors are wirings or electrodes formed of the source material, and the third conductors are the wiring and the electrode formed of the pixel electrode material.

In the LCD having the aforementioned configuration, the first conductors in EMBODIMENT 1 through EMBODIMENT 6 are wirings or electrodes formed of the gate material, the second conductors are wirings or electrodes formed of the source material, and the second conductors are the wirings and the electrodes formed of the source material. In the LCD of the present invention, the following effects are provided in addition to the effects shown in EMBODIMENT 1 through EMBODIMENT 6.

When the gate material is inferior to the source material in corrosion resistance, the mechanical strength or the contact resistivity, (for example, gate material is semiconductor film or multi-layer film using either metal of Al, Cu, or alloy with at least one of them as essential elements, source material is semiconductor film or multi-layer film or multi-layer film between the conductive film using either metal of Cr, or Ti, or alloy with at least one of them as essential elements and ITO), the reliability can be improved by converting the gate wiring into the wiring formed of the source material by using the embodiment, thus enabling the LCD low in cost and high in reliability.

When the source material is inferior to the gate material in corrosion resistance, mechanical strength or contact resistivity, the same effects can be obtained by converting the source wiring into wiring formed of the gate material.

EMBODIMENT 8

Figure 6A:
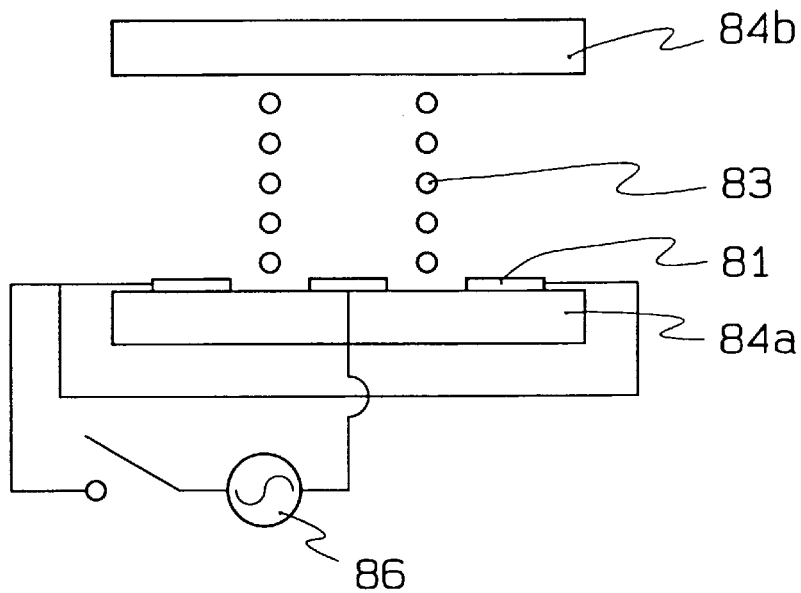
FIGS. 6(*a*) and 6(*b*) are each sectional view showing the construction of the inplane electric field LCD of the present invention.
Figure 6B:
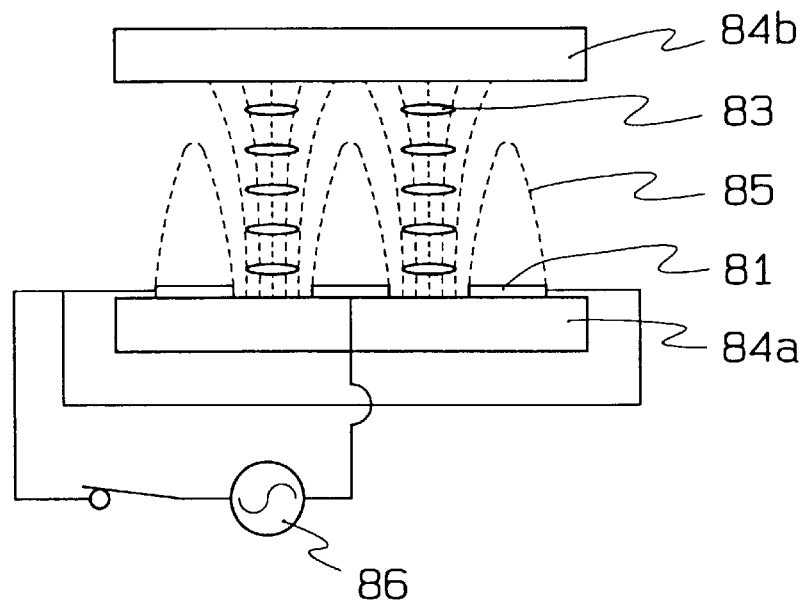

This is an example of inplane electric field LCD in a system where the direction of the electric field to be applied to the liquid crystal is parallel to the substrate in the combination including at least one of EMBODIMENT 1 through EMBODIMENT 7. FIGS. 6(a) and 6(b) are each sectional view showing the construction of the inplane electric field LCD of this embodiment. Referring to FIGS. 6(a) and 6(b), reference numeral 81 is a comb like shape electrode, reference numeral 83 is a liquid crystal molecule, reference numeral 84a is an electrode substrate where the comb like shape electrode is formed, reference numeral 84b is an opposite substrate opposite to the electrode substrate 84a, and reference numeral 86 is an AC voltage power.

The inplane electric field LCD of this embodiment is composed of an electrode substrate, an opposite substrate opposite to the electrode substrate, and a liquid crystal displaying element composed of liquid crystal interposed between the electrode substrate and the opposite substrate with the periphery of the electrode substrate and the periphery of the opposite substrate being bonded with the sealing agent, and having at least a driving circuit for driving the liquid crystal, and a back light. A pair of electrodes composed of at least the first electrode and the second electrode are provided across the constant distance are provided on the electrode substrate, and the alignment layer is provided covering the first electrode and the second electrode. Further, the first terminal and the second terminal are provided for connection with the outer portion on the periphery of the displaying region where the first electrode and the second electrode are provided. In order to connect the first terminal with the first electrode, or to connect the second terminal with the second terminal, a convertor is provided composed of a first conductor connected with the first electrode, a third conductor connecting the second conductor connected with the second electrode as in EMBODIMENT 1 through EMBODIMENT 7. As in EMBODIMENT 1 through EMBODIMENT 7, the convertor is provided covering with the sealing agent or the alignment layer or is provided on the outer side of the region where the sealing agent is formed.

EMBODIMENT 9

Figure 7:
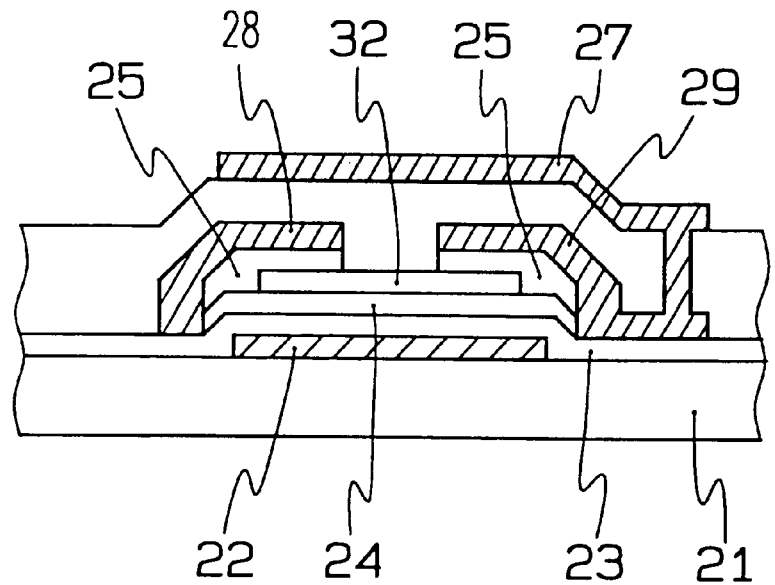
FIG. 7 is a sectional view of a TFT array substrate to be used for the reflection LCD of the present invention.

This embodiment, including at least one of EMBODIMENT 1 through EMBODIMENT 7, is an example of the reflective LCD composed of a conductive film or multi-layer film using them, using either metal such as Al, Cr or Ta or the like with at least of them as the essential element. FIG. 7 is a sectional view of a TFT array substrate to be used for the reflective LCD of the embodiment. FIG. 7 is a sectional view of the TFT array substrate to be used for reflective LCD of this embodiment. Referring to the drawing, reference numeral 32 is an etching stopper, and the same reference numerals are given to the same elements as those shown in FIGS. 1(a) through 5(b). In the TFT array substrate, the pixel elements are provided on the TFT.

The reflective LCD of this embodiment is composed of a TFT array substrate, an opposite substrate opposite to the TFT array substrate and a liquid crystal interposed between the TFT array substrate and the opposite substrate with the periphery of the TFT array substrate and the periphery of the opposite substrate being bonded with the sealing agent, and having at least a liquid crystal displaying element, and a driving circuit for driving the liquid crystal. The pixel electrode and the TFT composed of metal film are provided on each pixel provided on the TFT array substrate and marked with the mutually intersected gate wiring and the source wiring, and the alignment layer is provided covering the gate wiring, the source wiring, the pixel electrode and the TFT. The convertor made of the third conductor for connecting the first conductor, connected with the gate wiring, with the second conductor, connected with the source wiring, is provided in EMBODIMENT 1 through EMBODIMENT 7. As in EMBODIMENT 1 through EMBODIMENT 7, the convertor is provided covering with the sealing agent or the alignment layer or is provided on the outer side of the region where the sealing agent is formed. Thus, the same effects as those of EMBODIMENT 1 can be obtained and the liquid crystal displaying high in reliability can be obtained.

EMBODIMENT 10

Figure 8:
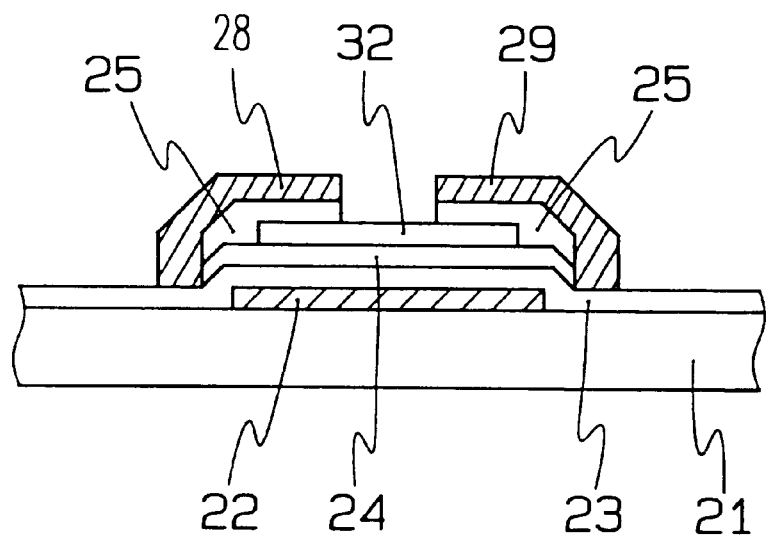
FIG. 8 is a sectional view of an etching stopped system of a TFT.

This embodiment is composed of at least one of the EMBODIMENT 1 through EMBODIMENT 7, and is an example of the LCD having an etching stopper system TFT. The LCD of this embodiment, where the TFT to be used in EMBODIMENT 1 through EMBODIMENT 7 is replaced by the etching stopper system TFT, is the same as EMBODIMENT 1 through EMBODIMENT 7 except for this point. FIG. 8 is an sectional view of an etching stopper system of TFT in numeral 32 is a passivation film, and the same reference numerals are given to the same elements as those shown in FIGS. 1(a) through 5(b). The characteristics in the configuration of the TFT are that the passivation film 32 is provided, on the semiconductor 24, as etching stopper. Thus, the same effects as those of EMBODIMENT 1 can be obtained and the liquid crystal displaying high in reliability can be obtained.

EMBODIMENT 11

Figure 9:
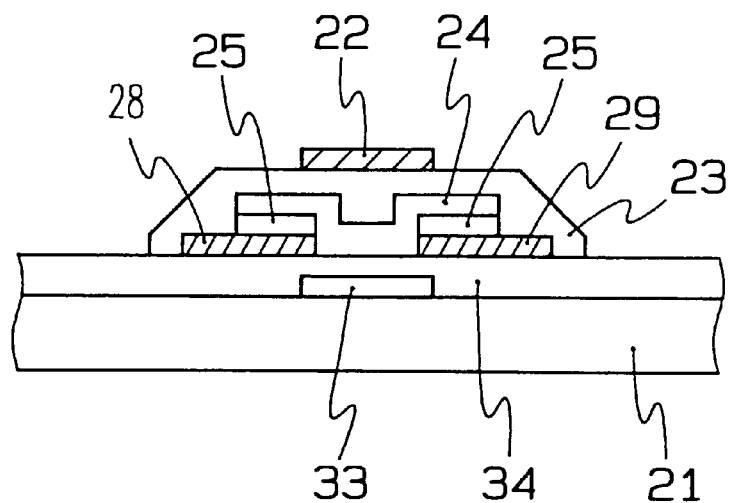
FIG. 9 is a sectional view of a normal staggered TFT.
Figure 10:
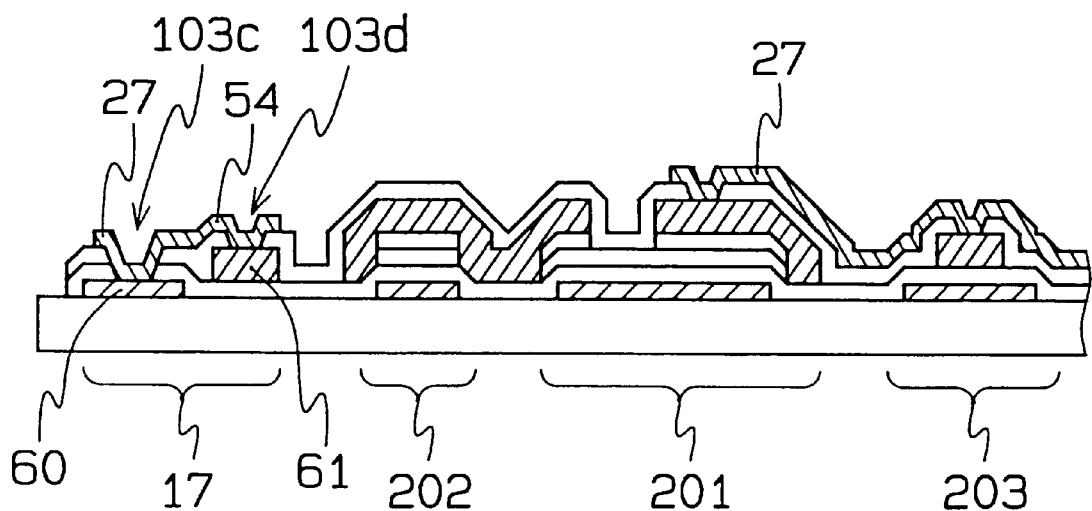
FIG. 10 is a sectional view of the main essential portions of a TFT array substrate of an LCD to be used in the conventional TFT.
Figure 11:
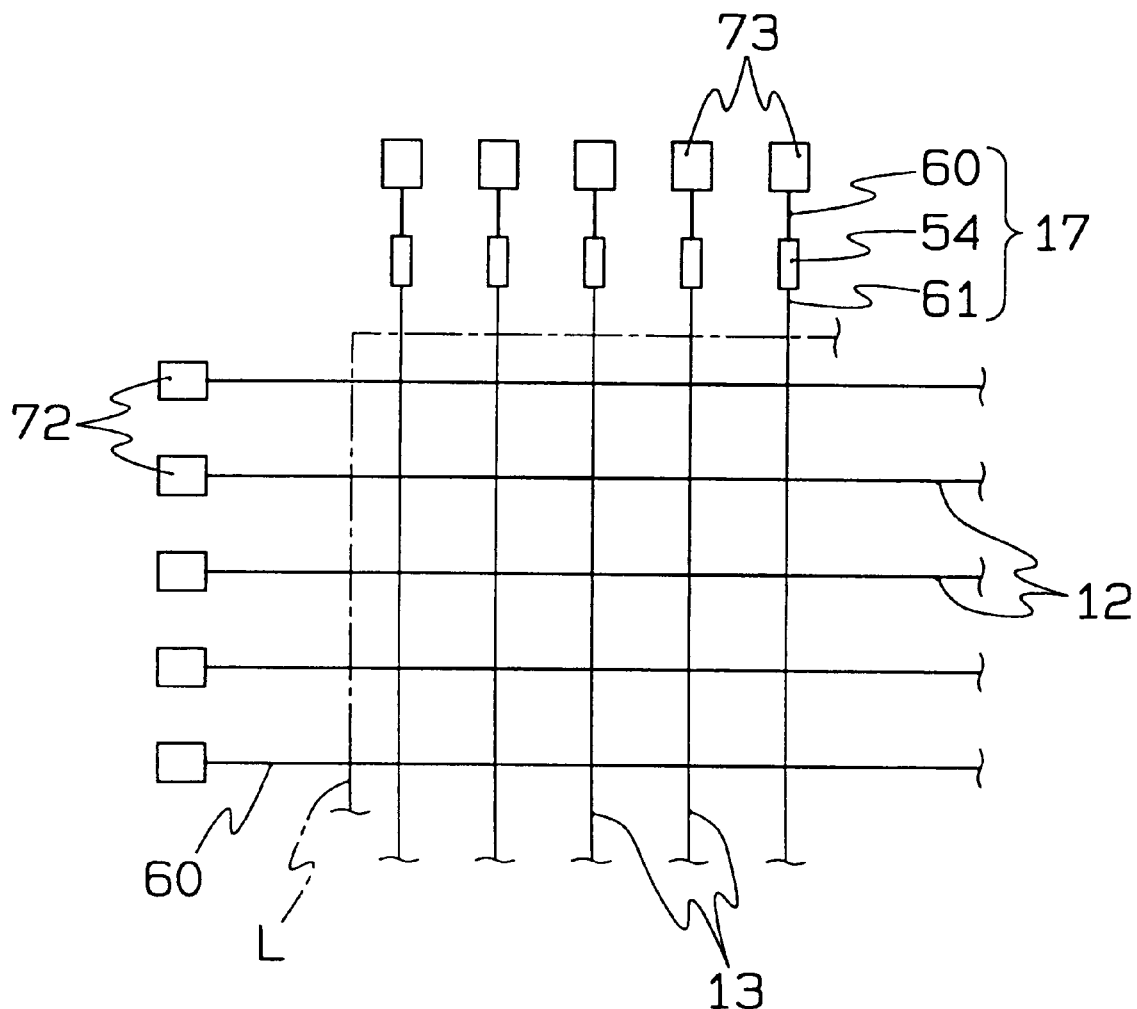
FIG. 11 is a plan view showing the arrangement of the wirings, and terminals provided on the conventional TFT substrate.
Figure 12:
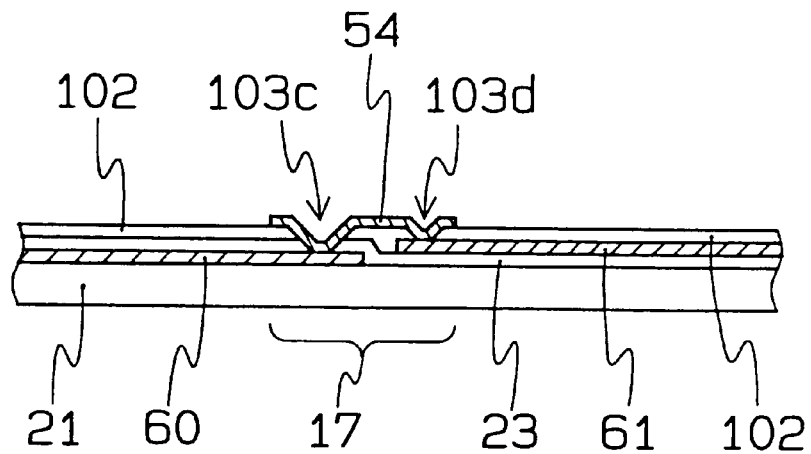
FIG. 12 is a sectional view showing the, connection between a conductor and a contact hole.
Figure 13:
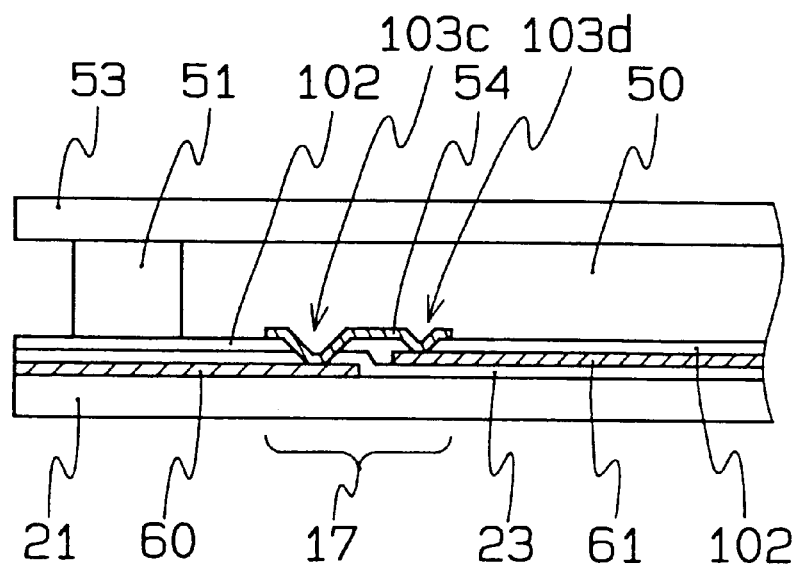
FIG. 13 is a sectional view showing the example where the connection is provided in contact with the liquid crystal.

This embodiment is composed of at least one of the EMBODIMENT 1 through EMBODIMENT 7, and is an example of the LCD having a staggered TFT. The LCD of this embodiment, where the TFT to be used in EMBODIMENT 1 through EMBODIMENT 7 is replaced by the staggered TFT, is the same as EMBODIMENT 1 through EMBODIMENT 7 except for this point. FIG. 9 is a sectional view of a staggered TFT in the embodiment. Referring to the drawing, reference numeral 33 is a light shielding film, reference numeral 34 is an insulating film, and the same reference numerals are given to the same elements as those shown in FIGS. 1(a) through 5(b). The characteristics in the configuration of the staggered system TFT are that the source electrode and the gain electrode and the vertical relation to the gate electrode are made almost reverse to the TFT using EMBODIMENT 1 through EMBODIMENT 7. Thus, the same effects as those of the embodiment 1 can be obtained and the liquid crystal displaying high in reliability can be obtained.

EMBODIMENT 12

This embodiment is composed of EMBODIMENT 8, and is an example of the LCD where the electrode which applies the voltage upon the liquid crystal is formed of the conductor of the same layer. The LCD of this embodiment is the same as EMBODIMENT 8 except in that the electrode which applies the voltage upon the liquid crystal is formed of the conductor of the same layer. Thus, the same effects as those of EMBODIMENT 8 can be obtained and the liquid crystal displaying high in reliability can be obtained.

A liquid crystal displaying element of the present invention is composed of a TFT array substrate, an opposite substrate opposite to the TFT array substrate, and a liquid crystal interposed between the TFT array substrate and the opposite substrate, (a) the periphery of the TFT array substrate and the opposite substrate is bonded with a sealing agent, (b) a pixel electrode and a TFT are provided on each pixel marked by the gate wiring and the source wiring provided on the TFT array substrate and crossed mutually, (c) an alignment layer is provided covering the displaying region where the gate wiring, the source wiring, and the pixel electrode and the TFT are positioned in matrix shape, (d) the gate terminal and the source terminal are provided on the periphery of the displaying region, (e) when the extending line to the gate terminal is formed with a material superior in corrosion resistance of a first conductor to be used as a material of the gate wiring, and a second conductor to be used as a material of the source wiring, the gate terminal and the gate wiring are connected, the extending line to the source terminal is formed and the source terminal and the source wiring are connected, a convertor where the first conductor and the second conductor are connected through the third conductor in the connecting portion between the first conductor and the second conductor is a liquid crystal displaying element, and the convertor is positioned covered with the sealing agent in the area were the sealing agent is formed. The leaking is not caused between the corrosion of the convertor, the physical damage and the displaying apparatus outer portion. Thus, the liquid crystal displaying element high in reliability can be obtained.

What is claimed is:

1. A liquid crystal displaying element comprising:
    a TFT array substrate, an opposite substrate opposite to the TFT array substrate, and
    a liquid crystal interposed between the TFT array substrate and the opposite substrate,
    wherein (a) a periphery of the TFT array substrate and a periphery of the opposite substrate are bonded with a sealing agent, (b) a pixel electrode and a TFT are provided on each pixel divided by a gate wiring and a source wiring provided on the TFT array substrate and crossed mutually, (c) an alignment layer covers a displaying region where the gate wiring, the source wiring, the pixel electrode, and the TFT are positioned in a matrix, (d) a gate terminal and a source terminal are provided around the displaying region, and (e) a converter located within the sealing agent connects a first wiring covered with an insulating layer to a second wiring also covered with an insulating layer through a third wiring via contact holes, wherein said converter converts a conducting material of a wiring within the display region to a conducting material of a wiring outside the display region which is more corrosion resistant than the wiring within the display region.

2. The liquid crystal displaying element of claim 1, wherein the third conductor is formed on a different layer and an uppermost layer through the first conductor and the second conductor and an insulating film.

3. The liquid crystal displaying element of claim 2, wherein the sealing agent is made of a material selected from the group consisting of a thermosetting synthetic resin and photocuring synthetic resin.

4. An IPS mode liquid crystal displaying apparatus comprising:
    an electrode substrate,
    an opposite substrate opposite to the electrode substrate, and
    a liquid crystal interposed between the electrode substrate and the opposite substrate, and at least a liquid crystal displaying element with a periphery of the electrode substrate and the opposite substrate being bonded with a sealing agent, a drive circuit for driving the liquid crystal, and a backlight,
    wherein (a) at least a pair of electrodes composed of a first electrode and a second electrode are provided at a constant distance on the electrode substrate; (b) the liquid crystal is driven by an electric field formed between the first electrode and the second electrode, (c) an alignment layer is provided covering a display region where the first electrode and the second electrode are positioned, (d) a first terminal and a second terminal are positioned on a periphery of the displaying region, (e) a converter located within the sealing agent connects a first wiring covered with an insulating layer to a second wiring also covered with an insulating layer through a third wiring via contact holes, wherein said converter converts a conducting material of a wiring within the display region to a conducting material of a wiring outside the display region which is more corrosion resistant than the wiring within the display region.

5. The IPS mode LCD of claim 4, wherein the pair of electrodes are composed of a conductor of a same layer.

6. A reflective LCD comprising:
    a TFT array substrate,
    an opposite substrate opposite to the TFT array substrate, and
    a liquid crystal interposed between the TFT array substrate and the opposite substrate, and having at least a liquid crystal displaying element with a periphery of the TFT array substrate and the opposite substrate being bonded with a sealing agent, a drive circuit for driving the liquid crystal,
    wherein (a) a pixel electrode and a TFT made of a metal film at each pixel marked by a gate wiring and a source wiring are provided on the TFT array substrate and intersected mutually, (b) an alignment layer is provided covering a displaying region where the gate wiring, the source wiring, the pixel electrode and the TFT are provided in a matrix, (c) a gate terminal and a source terminal are provided on a periphery of the displaying region, (d) a converter located within the sealing agent connects a first wiring covered with an insulating layer to a second wiring also covered with an insulating layer through a third wiring via contact holes, wherein said converter converts a conducting material of a wiring within the display region to a conducting material of a wiring outside the display region which is more corrosion resistant than the wiring within the display region.

* * * * *